(12) United States Patent
Pearce et al.

(10) Patent No.: US 12,353,892 B2
(45) Date of Patent: *Jul. 8, 2025

(54) SYSTEM AND METHOD FOR AUTOMATED CONFIGURATION OF A COMPUTING DEVICE

(71) Applicant: THE TORONTO-DOMINION BANK, Toronto (CA)

(72) Inventors: Michael Reid Pearce, London (CA); Chad Philip McKenzie, London (CA)

(73) Assignee: THE TORONTO-DOMINION BANK, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/101,356

(22) Filed: Jan. 25, 2023

(65) Prior Publication Data

US 2023/0161605 A1    May 25, 2023

Related U.S. Application Data

(63) Continuation of application No. 16/742,330, filed on Jan. 14, 2020, now Pat. No. 11,593,124.

(51) Int. Cl.
*G06F 9/445* (2018.01)
*G06F 8/65* (2018.01)
*G06Q 10/10* (2023.01)

(52) U.S. Cl.
CPC ............ *G06F 9/44505* (2013.01); *G06F 8/65* (2013.01); *G06Q 10/10* (2013.01)

(58) Field of Classification Search
CPC ....................................................... G06F 9/44
See application file for complete search history.

(56) References Cited

U.S. PATENT DOCUMENTS 5,504,746 A    4/1996 Meier
6,826,165 B1   11/2004 Meier et al.
(Continued)

FOREIGN PATENT DOCUMENTS

CN    104955016 B    7/2018

OTHER PUBLICATIONS

Schroeder, Michael D., et al. "A high-speed, self-configuring local area network using point-to-point links". IEEE Journal on Selected Areas in Communications 9, 8, Apr. 20, 1990, pp. 1318-1335.

*Primary Examiner* — Phil K Nguyen

(57) ABSTRACT

There is provided a computer-implemented method, device and system for automatically configuring a computer device located at a particular location of an entity having an associated local network. The method, system and device further comprises: detecting from another computer device metadata characterizing the particular location; determining from the metadata whether the computer device requires configuration and if so, performing configuration steps of: automatically determining a device type for the computer device based on one or more connected peripheral devices, the device type defining a role of the computer device within the particular location; sending metadata comprising the particular location and the device type to a central server for requesting configuration of the computer device and in response, receiving configuration information for the computer device. The configuration information comprises configuration settings for configuring the computer device to allow said one or more transactions to be performed thereon.

19 Claims, 3 Drawing Sheets

(56) References Cited

U.S. PATENT DOCUMENTS

| | | | |
|---|---|---|---|
| 7,376,717 | B2 | 5/2008 | Bhogal et al. |
| 7,752,653 | B1 | 7/2010 | Droms et al. |
| 8,321,571 | B2 | 11/2012 | Crowder, Jr. et al. |
| 8,966,018 | B2 | 2/2015 | Bugwadia et al. |
| 9,027,077 | B1* | 5/2015 | Bharali ................ G06F 21/00 |
| | | | 726/1 |
| 9,535,714 | B2 | 1/2017 | Olsson et al. |
| 9,626,211 | B2 | 4/2017 | Riewrangboonya et al. |
| 9,712,486 | B2 | 7/2017 | Johnson et al. |
| 10,038,989 | B1 | 7/2018 | Wesby et al. |
| 10,447,483 | B1* | 10/2019 | Su ...................... H04L 9/3226 |
| 2003/0110331 | A1* | 6/2003 | Kawano ................ G06F 1/24 |
| | | | 710/58 |
| 2006/0047783 | A1* | 3/2006 | Tu ................... G06F 9/44505 |
| | | | 709/220 |
| 2006/0143600 | A1* | 6/2006 | Cottrell ................ G06F 21/572 |
| | | | 717/168 |
| 2007/0240002 | A1* | 10/2007 | Motoyama ........... G06F 1/3287 |
| | | | 713/320 |
| 2008/0189628 | A1* | 8/2008 | Liesche ............... G06F 16/9535 |
| | | | 707/E17.109 |
| 2011/0072118 | A1* | 3/2011 | Day .................... H04L 41/0806 |
| | | | 709/222 |
| 2011/0138024 | A1* | 6/2011 | Chen ...................... H04L 67/52 |
| | | | 709/220 |
| 2012/0158203 | A1* | 6/2012 | Feldstein ............ H04L 12/2829 |
| | | | 713/320 |
| 2012/0173765 | A1* | 7/2012 | 't Hooft .............. G06F 11/3051 |
| | | | 710/8 |
| 2013/0019089 | A1* | 1/2013 | Guidotti ................ G06F 9/5072 |
| | | | 713/100 |
| 2014/0089531 | A1* | 3/2014 | Bhogal ................ G06F 9/4411 |
| | | | 710/8 |
| 2015/0081859 | A1 | 3/2015 | Xu et al. |
| 2016/0301680 | A1* | 10/2016 | Main ...................... H04W 12/37 |
| 2017/0017481 | A1* | 1/2017 | Cherian .................. G06F 3/017 |
| 2020/0092165 | A1* | 3/2020 | Sellers ............... H04L 41/0893 |

* cited by examiner

300

Determining at the computer device, based on received branch identification information from a local branch server, the particular branch
302

Determining device not configured with branch requirements
304

Determining a device type for the computer device based on one or more connected peripheral devices, the device type defining a role of the computer device within the particular branch;
306

Sending metadata information identifying the computer device including the particular branch and the device type to a central server for requesting configuration of the computer device;
308

Receiving from the central server configuration information for the computer device, the configuration information comprising a unique identification number for uniquely identifying the computer device for the transactions and configuration settings for configuring the computer device according to pre-defined requirements for the particular branch in dependence upon the device type
310

Configuring the computer device using the configuration information to uniquely perform the transactions for the financial institution using the unique identification number and permit processing of the transactions according to the configuration settings.
312

Fig. 3

SYSTEM AND METHOD FOR AUTOMATED CONFIGURATION OF A COMPUTING DEVICE

CROSS REFERENCE TO RELATED APPLICATION

This application is a continuation of U.S. patent application Ser. No. 16/742,330, filed Jan. 14, 2020, and entitled "SYSTEM AND METHOD FOR AUTOMATED CONFIGURATION OF A COMPUTING DEVICE", the contents of which are incorporated herein by reference.

FIELD OF INVENTION

The present disclosure generally relates to computer-implemented systems and methods for automated configuration of computer devices in a local network, such as within a location of an entity for enabling transactions on behalf of the entity from the configured computer devices.

BACKGROUND OF THE INVENTION

In each branch of a financial institution, a number of computer workstations are utilized to execute various financial transactions and perform administrative functions relating to the institution. Typically, a developer or technician determines whether a new workstation requires manual setup, enrollment and configuration to be recognized as part of the institution. Devices are then manually associated with a particular branch of the financial institution in accordance with a "Book of Records" before any transaction can be effected. This means that in order to properly track transactions and ensure authorization to access financial information and/or execute any transactions, a workstation executing transactions on behalf of a particular branch must be authorized, uniquely identifiable and configured within a local network (e.g. retail LAN) of that branch. Currently, any such configurations are performed manually according to manually checking requirements and can quickly become out of date. Such manual processes can be time consuming, inconvenient, and rely on the availability of a skilled technician at the local branch to perform the required configuration. Also, as the role of a workstation changes, these manual configurations quickly become obsolete and erroneous. Notably, where a large number of workstations are mobile and thus can travel to different branches or can move to different locations within the branch and thereby have different functional roles within the location such as a branch (e.g. teller, back counter, side counter, etc.) and thus need not be consistently configured with the same parameters and/or associated with the same branch's LAN at all times, the concerns regarding manual configuration of the workstations are particularly magnified. For example, such manual configuration is not scalable as the number of workstations increases and also becomes prone to human errors. This manual configuration is also prone to downtime of resources until manual setup is complete.

It would thus be desirable to provide new and improved systems and methods for automatically and dynamically configuring computer devices such as workstations in a location of an entity, such as a branch of a financial institution for accurately and efficiently effecting transactions in association with the location of the entity.

SUMMARY

It is to be understood that both the foregoing general description and the following detailed description are exemplary and explanatory only and are not restrictive of the claims.

In at least one aspect, there is provided an improved system and method that automatically configures computer devices located within a branch to a local network for the branch to enable transaction processing in accordance with requirements for the institution and/or the branch. In at least one aspect, the improved systems and methods also dynamically reconfigure mobile workstations when they are re-located and operating in a different branch than originally configured.

Exemplary advantages of the current system and method include one or more of, but not limited to: decreased reliance on a local branch server for setup and enrollment of devices associated with the local branch server; ability to automatically detect changes with workstations within a local network and automatically configure same; potential to allow changes to network configurations easily such that a mobile workstation can play different roles within a branch at different time; and ability to accurately classify device types for the computer devices in the branch such as to uniquely determine their configuration needs based on their device types.

According to an aspect of the present invention there is provided a computer implemented method for automatically configuring a computer device located at a particular branch of a financial institution associated with a local network for the particular branch for enabling financial transactions, the method comprising: detecting at the computer device, based on received branch identification information from a local branch server, the particular branch; upon determining that the computer device is not configured for the local branch server, performing configuration steps of: determining a device type for the computer device based on one or more connected peripheral devices, the device type defining a role of the computer device within the particular branch; sending metadata information identifying the computer device including the particular branch and the device type to a central server for requesting configuration of the computer device; in response to said sending, receiving configuration information from the central server for the computer device, the configuration information comprising a unique identification number for uniquely identifying the computer device for the financial transactions and configuration settings for configuring the computer device according to pre-defined requirements for the particular branch in dependence upon the device type; and configuring the computer device using the configuration information to uniquely perform the transactions for the financial institution using the unique identification number and permit processing of the transactions according to the configuration settings.

According to another aspect there is provided a non-transitory computer readable medium storing computer executable instructions for automatically self configuring a computer device located at a particular branch of a financial institution operating within a local area network of the financial institution for enabling transactions, the computer executable instructions being executable by a processor and when executed by the processor causes: detecting at the computer device, based on received branch identification information from a local branch server, the particular branch; upon determining that the computer device is not configured for the local branch server, performing configuration steps of: determining a device type for the computer device based on one or more connected peripheral devices, the device type defining a role of the computer device within the particular branch; sending metadata information identifying the computer device including the particular branch and the device type to a central server; in response to said sending, receiving configuration information from the central server for the computer device, the configuration information comprising a unique identification number for uniquely identifying the computer device for the transactions and configuration settings for configuring the computer device according to pre-defined requirements for the particular branch in dependence upon the device type; and, configuring the computer device using the configuration information to uniquely perform the transactions within the local network of the financial institution using the unique identification number and perform processing of the transactions according to the configuration settings.

In yet another aspect, there is provided a computer device for performing automatic self configuration, the computer device located at a particular location of an entity having an associated local network, the device comprising: a storage device storing instructions; a communications interface; at least one processor in communication with the storage device and the communications interface configured to execute the instructions to: detect, based on received identification information from at least one other computer device at the particular location, metadata characterizing the particular location; determine, based on the metadata characterizing the particular location, whether the computer device requires configuration for performing one or more transactions and upon said determination of requiring configuration, performing configuration steps of: automatically determine a device type for the computer device based on one or more connected peripheral devices, the device type defining a role of the computer device within the particular location; send, via the communication interface, metadata identifying the computer device comprising the particular location and the device type to a central server for the entity for requesting configuration of the computer device; in response to said send, receive configuration information from the central server for the computer device, the configuration information comprising a unique identification number for uniquely identifying the computer device for the one or more transactions and configuration settings for configuring the computer device according to pre-defined requirements for the particular location in dependence upon the device type; and configure the computer device using the configuration information to permit processing of the one or more transactions for the computer device according to the configuration settings and the unique identification information.

BRIEF DESCRIPTION OF THE DRAWINGS

FIG. 3 is a flowchart illustrating an example operation of the computer device of FIG. 2, in accordance with one or more disclosed embodiments.

DESCRIPTION OF THE EMBODIMENTS

Reference will now be made in detail to embodiments of the present disclosure, examples of which are illustrated in the accompanying drawings. Wherever possible, the same reference numbers will be used throughout the drawings to refer to the same or like parts.

Figure 1:
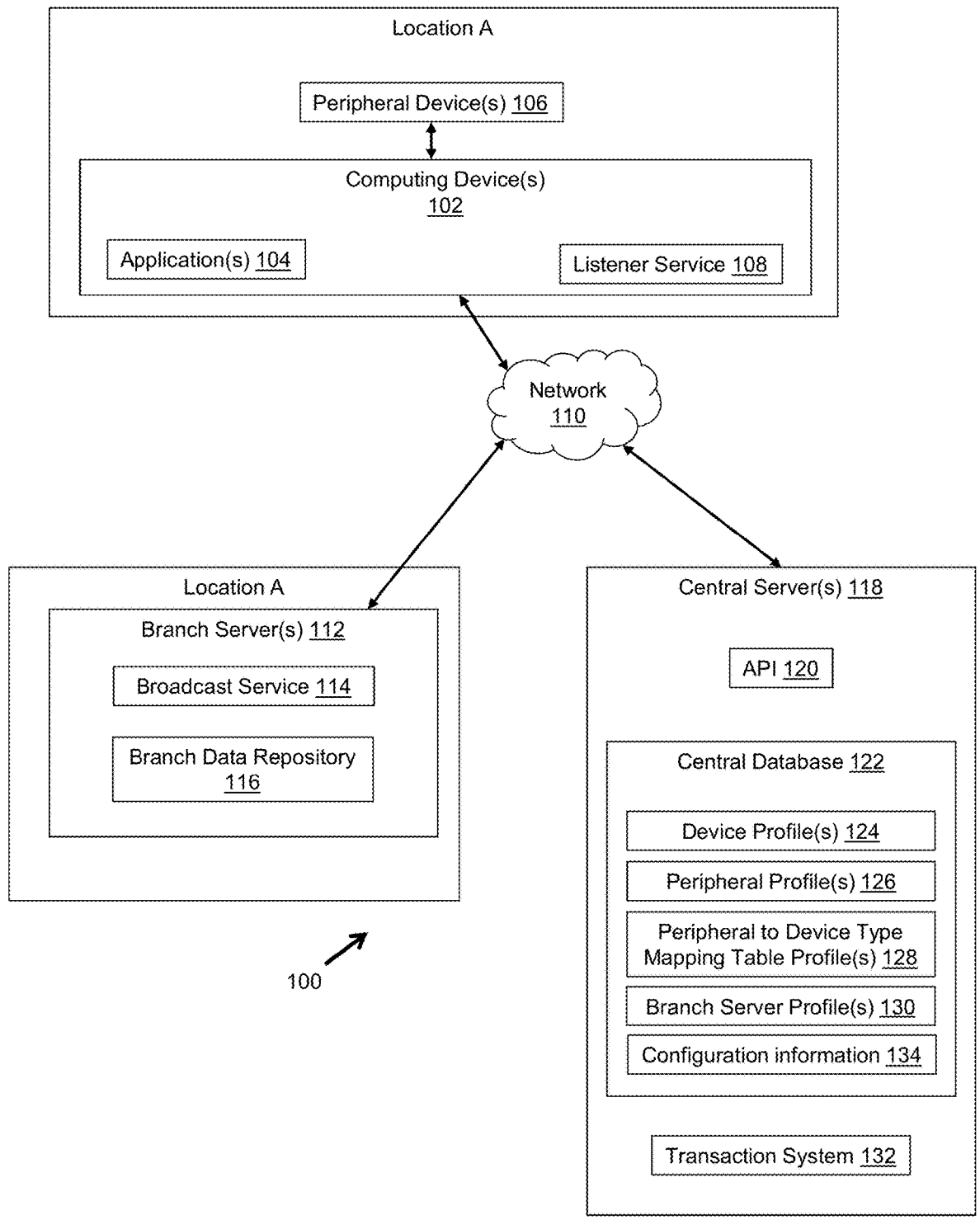
FIG. 1 depicts a system diagram of an example computing environment configured to provide automated configuration of a computer device located in a branch of a financial institution for effecting transactions in a local network, in accordance with one or more disclosed embodiments.

As used in the present disclosure, the term "computer" or "computer device" is intended to encompass any suitable computerized processing device. For example, this may include any computer or processing device such as, for example, a server, general-purpose personal computer (PC), a mobile computer, a Mac®, workstation, UNIX-based workstation, or any other suitable device. Moreover, although FIG. 1 illustrates a single computing device, a single branch server and a single central server, any one of these can be implemented using two or more computer systems, as well as computers other than servers, including a server pool. In other words, the present disclosure contemplates computers other than general purpose computers, as well as computers without conventional operating systems.

As disclosed herein, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, any section headings used herein are for organizational purposes only, and are not to be construed as limiting the subject matter described.

In certain embodiments, a transaction may reflect activities associated with a financial service account (e.g., financial service transactions) or administrative tasks related to financial transactions (e.g., reviewing and reporting transactions, inquiries for transactions such as checking balance amounts or pre-approval requests). For example, financial services transactions may include transactions such as financial account payments, fund transfers, bill payments, fund deposits, and the like. Other types of transactions may be envisaged and affiliated with being allowed and/or configured as a result of said disclosed configuration of workstation aspects of the disclosed embodiments.

For example, the disclosed embodiments may include systems and methods for automatically configuring one or more workstations located within a physical location of an entity such as to allow monitoring and controlling an individual's activities on the workstation that may not be related to purchase or financial service transactions (e.g. can be related to administrative or managerial communication for transactions) but other transactions envisaged and complying to requirements of the entity and/or the location of the entity. Other aspects of the disclosed embodiments are described below and exemplified in the accompanying figures. Although certain embodiments are sometimes described in connection with financial service systems and processes, the disclosed embodiments are not so limited. Aspects of the disclosed embodiments may be configured to handle other types of activities and events that may be unrelated to a transaction involving a good or service or a financial service transaction involving financial service accounts.

Generally, in at least one embodiment, there is provided a system and method to automate the configuration of computer workstations to uniquely identify them within a branch's network (e.g. associated with the branch's local server, e.g. RLAN server) and associate a particular computer workstation with its corresponding branch in order to effect transactions such that they can be uniquely monitored as associated with the corresponding branch. Additionally, in at least one embodiment, one or more functional roles of the particular workstation (and thereby its configuration settings for one or more computer applications related to transactions) within the institution and location are determined based on automatically determining one or more peripheral devices connected to the particular workstation.

In at least one embodiment, configuration settings and a unique identification number (identifying the workstation as associated with its corresponding branch) are provided by a central server of the institution to each workstation (e.g. a first workstation) located in that branch in dependence upon the determined peripheral devices for each workstation (e.g. the first workstation) and the corresponding branch's settings associated with the workstation (e.g. the first workstation).

FIG. 1 illustrates an exemplary computing environment 100, according with at least one disclosed embodiment for automatically configuring one or more computing device(s) (e.g. device 102) associated with a particular location (e.g. location A) of an entity to allow effecting transactions on behalf of the configured computing device and associated with the entity, such as a financial institution.

The computing system environment 100 comprises one or more computing device(s) 102, such as computer workstations, physically located inside a particular location of the financial institution, such as branch location A. The computing device 102 comprises one or more application(s) 104 for providing an interface and allowing financial transactions with the financial institution, when configured. The computing device 102 further comprises one or more connected peripheral devices 106, such as but not limited to: a pin pad, a cash recycling unit, a cash dispensing unit, a general purpose printer, a thermal printer, an impact printer, a general purpose scanner, a cheque scanner, a mouse, and a keyboard. Generally, the peripheral devices 106 are defined as a computer device, such as a keyboard or printer that is not part of the essential computer (i.e., the memory and microprocessor). These auxiliary devices are intended to be connected to the computer and used to put information into and get information out of the computer.

The computing device 102 further comprises a computer implemented listener service 108 configured for listening for broadcast messages from one or more local branch server(s) 112 associated with the particular location, e.g. branch A. In one example, the listener service 108 may detect that the branch server 112 is broadcasting or multicasting branch identification information via the broadcast service 114.

Thus, the listener service 108 is further configured for managing traffic received at the computing device 102 from the server 112 in broadcast or multicast format. The listener service 108 thereby receives identification information for the location (e.g. identifier for branch server 112 including a physical server name for branch server 112 and/or a virtual server name for branch server 112, branch settings including compliance and/or security requirements for branch A).

The computing environment 100 further comprises one or more branch server(s) 112 located in the particular branch (e.g. location A) comprising a broadcast service 114 and a branch data repository 116. The branch data repository 116 is a database comprising server 112 and/or location A identification information related to the entity (e.g. system 100). The branch data repository 116 comprises branch identification information (e.g. virtual server name, physical server name, MAC address of the branch server 112, branch specific settings including security and compliance settings for the particular branch to be used for configuration of the computing devices and any peripherals associated with the computing devices). The broadcast service 114 is configured for broadcasting (e.g. to all computing devices located in the branch) or multicasting (e.g. to a specific recipient computing device), the particular server's identity (e.g. the branch identification information for location A). In at least some embodiments, the broadcast message from the server 112 comprises branch settings as stored in the data repository 116 to one or more local computing device(s) 102 located within the particular branch. In some aspects, the broadcast service 112 is only triggered upon detecting a new computing device 102 within the branch and/or movement of an existing computing device 102 within the branch which needs configuration. In said aspect, the broadcast service 114 communicates directly to the computing device 102 and submits information regarding the particular branch to facilitate configuration.

The computing system environment 100 further comprises a central server 118. The central server 118 comprises an application programming interface (API) 120, a central database 122 and a transaction system 132.

The API 120 is configured to allow communications with external computing devices (e.g. 102 and/or 112), such as to provide an interface for accessing the components of the central server 118 such as the central database 122 and the transaction system 132. Thus, the API interfaces with the computing device 102 to receive requests therefrom for the configuration information 134 and in response to receiving identification information for the computing device 102 (e.g. via request information 222 in FIG. 2) provides access to the central database 122 containing the configuration information 134.

The central database 122 is configured generally for containing data regarding the computing devices 102 and the branch server 112. Database 122 may be one or more data storages configured to store information consistent with the disclosed embodiments. In one aspect, central database 122 comprises data and/or instructions including device profiles 124, peripheral profiles 126, mapping table profiles 128, branch server profiles 130, and configuration information 134.

In one aspect, for each location of a financial institution (e.g. location A, associated with a first branch), the central database 122 comprises a repository of the device profiles 124 (containing identification information for each of the computing devices 102 within the first branch). The device profiles 124 can further include: computing device 102 model, make, platform, serial number, details on when it was last updated, and the functional role of the device. The type or functional role of the device can include for example: cash dispensing unit, cash recycling unit, front desk, sales desk, service station, secure room, etc. The branch server profiles 130 are also contained in the central database 122 and can include identifying information for each branch server 112 in the financial institution, including branch server 112 and comprising: DNS name of the branch server and device ID of the branch server (e.g., an Internet Protocol (IP) address associated with the branch server 112).

The database 122 further comprises a repository of peripheral profiles 126 for each of the computing devices 102 associated with the branch server 112. The peripheral profiles 126 define, for each computing device 102, the specific peripheral devices connected to the device 102 in real-time. Thus, the central database 122 maintains a dynamic list of peripheral hardware devices (e.g. 106) that are connected to each computing device 102, thereby generating a real-time inventory of the peripheral hardware devices at each location, e.g. branch of a financial institution.

The database 122 further comprises a peripheral to device type mapping table profile 128 which provides a dynamic mapping list between potential peripheral device combinations and computing device 102 types. In some aspects, the peripheral to device type mapping table profile 128 is stored on the computing device 102. In another aspect, the mapping table profile 128 is provided to the computing device 102 upon request (e.g. polling, periodically or otherwise) from the computing device 102 to the central server 118.

For example, the mapping table profile 128 can indicate that a particular computing device 102 having a mouse, a thermal printer and a pin pad connected thereto represents a first device type (e.g. Device type A). As will be described herein, the device type as retrieved dynamically from the central server 118 will then indicate the specific configuration required as provided by the configuration information 134 to the computing device 102 for subsequent automatic configuration thereof (e.g. for enabling pre-defined transactions to be performed by the computing device 102). The configuration information 134 comprises a unique identification for the computing device 102 for effecting transactions and configuration settings for facilitating authorization of transactions being performed (e.g. via transaction system 132). The transactions once configured using the configuration settings can be effected using the unique identification.

In one embodiment as illustrated, the central server 118 comprises a financial transaction system 132. However, the financial transaction system 132 is not limited to such configurations, and, in additional embodiments, the system 140 can be executed on any computer or server separate from the central server 118. The financial transaction system 132 may be one or more computer systems associated with a financial institution, such as, for example, a commercial bank, an investment bank, a broker-dealer, a provider of a payment instrument and financial service accounts, etc. In some embodiments, a financial service account may be a check, savings, credit, debit, and/or a reward or loyalty account. These transactions include, but are not limited to, a transfer of funds between financial accounts (e.g., checking, savings, investment, etc.), a payment of a bill, a purchase or sale of a financial instrument or security, a deposit or withdrawal of funds, or an application for credit.

Central server 118 is configured to execute software instructions (e.g. via a memory storing the software instructions and a processor for executing the software instructions) to perform one or more processes consistent with the disclosed embodiments. In one embodiment, components 102, 106, 112, 118 may exchange information and parameters that facilitate an execution of one or more transactions by financial transaction system 132.

By way of example, a user may access a first computing device 102 having a first set of peripheral devices 106 connected thereto and initiate request for configuration in response to receiving an indication, via the broadcast signal from a first branch server 112 that the first computing device 102 is not configured for the branch server 112. The computing device 102 may then access the central database 122 via the API 120 and provide metadata characterizing the first device 102, first set of peripheral devices 106 and first branch server 112 to the central server 118 for respectively populating data within the device profile 124, peripheral profile 126 and branch server profile 130. Based on the data provided to the central server 118 via the first computing device 102, data from the mapping table profiles 128 (which may be stored locally on the computing device 102 and/or on the central server 118) is thus used to determine the device type.

In some aspects, upon determining that the computing device 102 is not configured for the first branch server 112, a prompt is presented via a user interface of the computing device 102 to a user to confirm that a location of the computing device 102 has changed to the particular branch and requesting confirmation of the identifying information for the computing device and the device type for confirming that the configuration steps are to be performed.

Subsequently, the device type retrieved is used to access the configuration information 134 for that device type to provide to the computing device 102 for uniquely identifying the first computing device 102 as being associated with first branch server 112 and for configuring the computing device 102 to allow effecting of transactions via the transaction system 132. As will be described, the database 122 further includes a dynamically generated whitelist in the device profiles 124 which contains a listing of computing entities, such as computing devices 102 authorized to communicate and effect transactions with the transaction system 132. Thus, the whitelist is used by the configuration information 134 to explicitly allow some identified computer entities access to a particular access, such as allowing the computing device 102 to perform transactions as a member of the associated branch and the financial institution. In one aspect, the whitelist is updated via the branch server 112 determining that a new computing device 102 has been added to the computing environment 100. In another aspect, the whitelist is updated via the central server 118 determining that a particular device type is allowed to effect transactions via the transaction system 132. Thus, in response to receiving a configuration request from the first computing device having the particular device type being considered acceptable for effecting transactions with the transaction system 132, the whitelist is updated to add the first computing device 102.

In some aspects, upon determining and receiving an indication of the device type at the central server 118, the central server 118 is configured to update and distribute to each computer device in a network of the local branch server (e.g. 112) a peripheral database such as that provided by the peripheral profiles 126 comprising metadata characterizing the device type and the connected peripheral devices for each computer device associated with the local branch server.

In this manner, one or more computing devices 102 within a computing system environment 100 are all aware of the connected peripheral devices for each of the computing device(s) 102.

Figure 2:
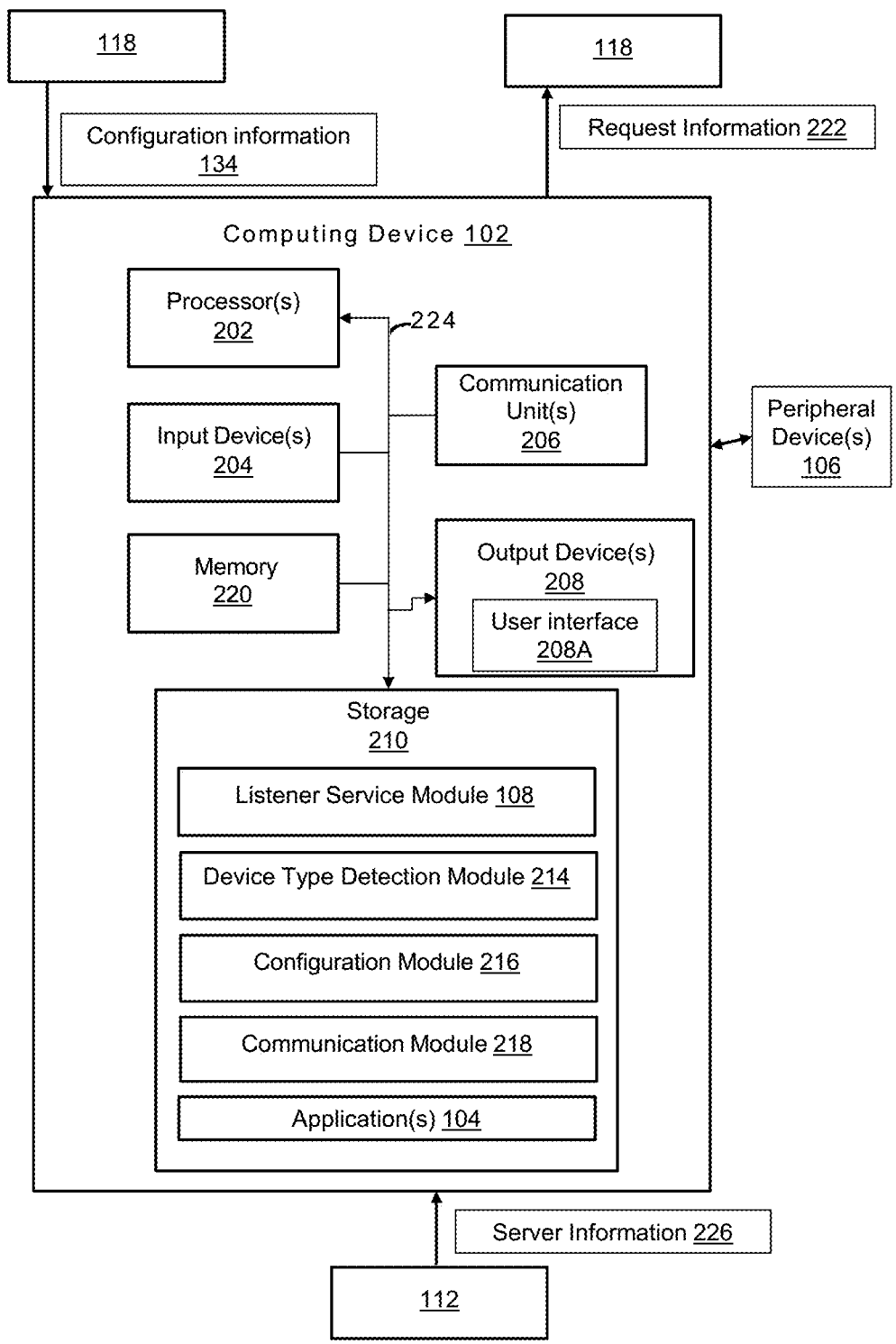
FIG. 2 depicts an example computer device for being automatically configured for uniquely effecting transaction(s) within the local network of FIG. 1, in accordance with one or more disclosed embodiments.

Referring to FIG. 2, shown is a schematic diagram of the computing device 102 of FIG. 1 in further detail, in accordance with one or more aspects of the present disclosure. Generally, in one or more aspects as described, the computing device 102 as described is adapted to receive an indication of requiring configuration to perform transactions. Notably, the configurations are for allowing transactions to be performed by the computing device 102 on behalf of the configured computing device for a particular location of the entity which the computing device 102 is associated with. In response to said indication, the device 102 is automatically configured (via communications with the central server 118 in FIG. 1) according to one or more of: pre-defined transaction requirements for the location of the entity (e.g. the local branch server 112 for the location) and transaction authorizations for the particular device type of the computing device 102. Thus, the computing device 102 automatically enrolls and configures itself to a local network associated with the branch (e.g. branch server 112) in order to be trackable when performing transactions and for enabling transaction applications on the computing device 102.

Referring again to FIG. 2, communication channels 224 may couple each of the components 202, 204, 206, 208, 208A, 210, 108, 214, 216, 218, and 220 for inter-component communications, whether communicatively, physically and/or operatively. In some examples, communication channels 224 may include a system bus, a network connection, an inter-process communication data structure, or any other method for communicating data. One or more processors 202 may implement functionality and/or execute instructions within the computing device 102. For example, processors 202 may be configured to receive instructions and/or data from storage 210 to execute the functionality of the modules shown in FIG. 2, among others (e.g. operating system, applications, etc.). Computing device 102 may store data/information to memory 220 and/or storage 210. Some of the functionality is described further herein below.

One or more communication units 206 may communicate with external devices such as one or more central servers 118, and one or more branch servers 112 depicted in FIG. 1, via one or more networks (e.g. network 110) by transmitting and/or receiving network signals on one or more of the networks. The communication units 206 may include various antennae and/or network interface cards, etc. for wireless and/or wired communications.

Input 204 and output 208 (including user interface 208A) devices may include any of one or more display screens, buttons, switches, pointing devices, cameras, a keyboard, a microphone, one or more sensors (e.g. biometric, etc.) a speaker, a bell, one or more lights, etc. One or more of same may be coupled via a universal serial bus (USB) or other communication channel, such as channel 224.

The one or more storage devices 210 may store instructions and/or data for processing during operation of computing device 102. The one or more storages 210 may take different forms and/or configurations, for example, as short-term memory or long-term memory. Storage 210 may be configured for short-term storage of information as volatile memory, which does not retain stored contents when power is removed. Volatile memory examples include random access memory (RAM), dynamic random access memory (DRAM), static random access memory (SRAM), etc. Storage 210, in some examples, also include one or more computer-readable storage media, for example, to store larger amounts of information than volatile memory and/or to store such information for long term, retaining information when power is removed. Non-volatile memory examples include magnetic hard discs, optical discs, floppy discs, flash memories, or forms of electrically programmable memory (EPROM) or electrically erasable and programmable (EEPROM) memory.

Communication module 218 may be configured to receive local server identification information 226 from the external branch server 112 for processing at the listener service module 108 and subsequent instruction of the configuration module 216 to initiate requesting configuration of the computing device 102.

Based on the server information 226, the listener service module 108 detects whether the computing device 102 is associated with the correct server (e.g. that the server information 226 matches the server associated with the computing device 102) or whether re-configuration of the computing device 102 is required. The listener service module 108 thus helps auto detecting what local server 112 the device 102 should be associated with when performing transactions and triggers configuration of the computing device 102 for effecting transactions.

Thus, in at least one aspect, the listener service module 108 listens for broadcast messages from servers 112, and upon detecting a change in the broadcast information, initiates executes of instructions stored in the storage 210 including the configuration module 216 and thereby the transmission of a request and data from the computing device 102 to a central database 122 on the central server 118.

In one aspect, the listener service module 108 is configured for listening for any incoming broadcast or multicast signals from the local branch server 112 and detects an updated signal from a new branch server indicating the computing device is now located in a second branch (e.g. location B different from location A), in response to the updated signal from the new branch server. In response to said detection, the configuration module 216 is triggered for performing one or more configuration steps as described herein to auto-detect the new device type at location B and submit a new request information on behalf of the relocated computing device 102 at the new branch server. Accordingly, in said aspect, the computing device 102 retrieves from the central server 118 new configuration information 134 including, but not limited to, a new unique identification number for the computer device associated with the second branch (e.g. location B) for authorizing performing processing of the transactions on behalf of the new branch server and branch via the transaction system 132.

If it is determined that configuration of the computing device 102 is required, the device type detection module 214 is triggered and configured to automatically detect and analyze one or more peripheral devices connected to the device 102 to thereby determine the functional role(s) that the device 102 will be performing in respect of transactions on behalf of the location of the branch and the financial institution. By way of example, and referring to FIGS. 1 and 2, the detected peripheral devices 106 from the detection module 214 may indicate that the device 102 is a financial processing computer such as a mortgage terminal for performing mortgage transactions and thus the configuration module 216 automatically submits a request for configuration of same (e.g. to configure one or more applications 104 on the computing device for allowing transactions and being uniquely identifiable) via request information 222.

In one aspect, the device type detection module 214, receives an indication of a change in the one or more connected peripheral devices 106. For example, the peripheral devices 106 can be connected to the computing device 102 via USB port, serial port, parallel port, specialized network card, or Ethernet network. Such indication of a change in the peripheral device connections can be triggered for example when a new peripheral device 106 is plugged into or otherwise communicatively connected to (e.g. wirelessly) the computing device 102 and detected by the processor 202. Accordingly, the device type detection module 214 responds to the change and accesses a peripheral to device type mapping table profile 128 (which may be stored locally or externally accessed via the central server 118) and determines an updated device type for the computing device 102 (e.g. from device type A to device type B, or front counter to side counter). Accessing the peripheral to device type mapping table 128 may be done for example via an API call made to the central server 118 requesting to pull down the mapping table 128 onto a local storage (e.g. storage 210 or memory 220) of the computing device 102. As can be envisaged, each device type defined on the mapping table 128 may have an associated specific defined role for the respective financial institution and/or branch as may be defined within configuration information 134. For example, device type A may be defined as only allowed to edit transactions of a certain type; device type B may be defined as only allowed to perform mortgage transactions; and device type C may be defined as only permitted to read transactions but not perform or submit any transactions. Further, in response to detecting the updated device type, the configuration module 216 is triggered to request and receive from the central server 118 updated configuration information 134 based on the updated device type (e.g. as provided in request information 222) for configuring the computing device 102 and one or more applications 104 associated with the change.

In at least one aspect, the peripheral to device type mapping table 128 may be accessible for viewing and/or manipulation via a user interface of an external computing device (e.g. via a user interface 208A provided by the output device(s) 208 on the computing device 102).

For example, a user may be presented with one or more interactive display screens relating to the device type mapping table 128, via the user interface 208A, and thereby input or update a specific mapping entry for a given device type (e.g. change device type A to device type B) on the central database 122 with a certain corresponding set of peripheral devices 106 (e.g. a computing device having connected peripheral devices including a printer and a scanner). In this manner, in at least one aspect, once a particular device type is updated in the mapping table 128 and/or newly entered via the user interface 208A, the central server 118 is configured, via one or more processors to generate updated configuration information 134 relevant to the updated device type (e.g. device type B) to associated computing devices 102 affected by the change of the device type in the user interface 208A. In response to receipt thereof, the configuration module 216 is operable to re-configure the computing device 102 according to the updated configuration information 134 such as to control and/or enable transaction processing accordingly.

Referring again to FIG. 2, the request information 222 provided by the computing device 102 to request configuration settings can include but not limited to: device identification information for the device 102 (e.g. hardware identification information, device name, user ID associated with device, device ID, MAC address, IP address) and the device type as determined by the device type detection module 214. The request information 222 is sent via the communication module 218 to the central server 118 for determining via the central database 122, the configuration information 134. The configuration information 134 includes a unique identifier for uniquely identifying the device 102 when performing transactions as being associated with the branch server where it is co-located (e.g. server 112) and with the corresponding financial institution.

In one aspect, the unique identifier is a string of characters containing identification for the financial institution (e.g. identifying computing system environment 100), the particular branch (e.g. location A), the computing device 102 and the device type.

The configuration information 134 further comprises configuration settings for the device 102 to allow it to perform transactions on behalf of the branch and the financial institution. By way of example, when a computing device 102 is moved to a different branch, the unique identifier provided by the central server 118 is updated to reflect the new branch and in some aspects, the device type for the computing device 102 as it may have changed in accordance with new peripheral devices connected thereto. By way of further example, the configuration settings may contain specific instructions for provisioning the device 102 and/or applications on the device 102 to allow certain transactions to be performed. For example, based on the device type and the branch settings as defined in 130, the configuration settings in the information 134 may indicate that the device 102 is allowed to perform a pre-defined list of transactions (e.g. mortgage approvals) and provide authorizations to enable functionality within the computing device 102 for performing same via the configuration module 216.

By way of example of a configuration of FIG. 1, a mobile workstation (e.g. an example of device 102) having device identifier #T259 is assigned unique identifier #A50 when configured in branch location A and re-assigned new unique identifier #B34 when configured in branch location B (having associated a new branch server).

In one aspect, the configuration settings define authorization for each of the transactions performed by the computer device in accordance with the device type and the branch server.

By way of further example, the configuration settings characterized in the configuration information 134 further define software application updates for one or more applications on the computing device 102 for performing transactions (e.g. via transaction system 132) executed on the computing device 102 in compliance with updates to the pre-defined requirements of the particular branch.

By way of yet another example, the configuration information 134 further defines security access rights for the computer device 102 for performing transactions and interacting with the transaction system 132, wherein the security access rights define at least one of: pre-defined transactions and types of pre-defined transactions that can be performed by the computer device 102 via the transaction system 132.

Accordingly, in accordance with one or more embodiments, the configuration module 216 is adapted to receive the configuration information 134, update and provision the unique identifier for the computing device 102 as decoded from the configuration information 134. The configuration module 216 is further adapted to use the configurations settings provided in the configuration information 134 to automatically configure one or more applications on the device 102 and/or the device 102 such as to enable allow transactions to be performed via the device 102. By way of example, the computing device 102 may be configured to have a unique identifier characterizing the branch server 112 it is associated with (via server information 226) and identifying the device 102 as part of the metadata for a financial transaction. Further, the configuration as performed by the configuration module 216 includes applying configuration settings to the allowable transactions and corresponding applications 104 for performing said allowable transactions. Thus, for example, in some aspects, the device 102 having a particular device type is permitted via the configuration information 134 as configured (via configuration module 216) to perform a pre-defined set of transactions (e.g. mortgage processing transactions having a defined security level) with the transaction system 132 of FIG. 1.

Additional types of configuration information 134 retrieved from the server 118 can include but not limited to: transaction application metadata for customizing one or more applications 104 on the device 102 to enable them to allow communication with the transaction processing system 132.

It is understood that the described operations may not fall exactly within the modules 108, 214, 216, and 218 of FIG. 2 such that one module may assist with the functionality of another module.

FIG. 3 is a flowchart illustrating example operations 300 of a computing device, namely the computing device 102 of FIGS. 1 and 2 in accordance with one or more aspects of the present disclosure for automatic configuration of the computing device in order to be associated with a local network of the corresponding branch server and enable transactions accordingly.

At step 302, operations obtain as input (e.g. from a branch server 112), metadata identifying server information (e.g. 226) for the branch server 112. Step 302 includes determining at the computer device 102, based on the received branch server identification information, the particular branch and associated server for the computing device. As described above, such determination may be based on receiving a broadcast signal with branch identification information from the local branch server 112. Thus, in at least one aspect, determining the particular branch at step 302 comprises listening for an incoming multicast or broadcast signal indicating a presence from the local branch server (e.g. 112) to a plurality of computer devices including the computer device 102 located on the local network of the particular branch. In at least one aspect, branch identification information provided in the multicast signal provides a physical name and a virtual name for the local branch server(s) 112.

This broadcast information will facilitate the computing device 102 to auto detect what particular local server 112 to connect to and sets up any transaction applications or transaction packets originating from the computing device 102 to indicate that the computing device 102 is associated with the particular server 112, which assists in tracking transactions in the central server 118 and namely, the transaction system 132.

At step 304, operations include determining, based on the received branch server identification information whether the device 102 is configured for the branch server 112 and thus the particular branch indicated therein. Notably if not configured, triggering one or more modules of the computing device 102 (e.g. 108, 214, 216, 218) to initiate automatic and dynamic configuration of the computing device 102 in order to enable transactions on behalf of the branch identified in the server identification information.

At step 306, operations include determining a device type for the computer device 102 based on one or more connected peripheral hardware devices (e.g. 106) connected thereto. As described herein, the device type defines a role of the computer device 102 within the particular branch and/or the financial institution. By way of example, the device type in a branch of a financial institution can include: cash device, front counter, side counter, retail device, call centre device. In one aspect, determining the device type comprises accessing a mapping table (e.g. mapping table profile 128) comprising various potential combinations of peripheral devices for the financial institution, each of said combinations associated with a specific device type. The mapping table 128 is stored on the central server 118 in one aspect and accessed by the computing device 102. In another aspect, the mapping table 128 is stored directly on the computing device 102 or otherwise accessible to the computing device 102 (e.g. via a web portal). By way of example, the type of potential peripheral devices can include but not limited to: printer, scanner, thermal printer, cheque scanner, cash dispensing unit, and cash recycling unit. Other types of peripheral devices may be envisaged by a person skilled in the art.

At step 308, the operations include, subsequently sending a configuration request to the central server 118 via sending metadata information identifying the computing device 102 including the particular branch (e.g. branch server 112) and the determined device type to the central server 118 for requesting automatic configuration of the computing device 102.

At step 310, the operations include, in response to said request for configuration, receiving from the central server 118, configuration information for the computer device 102 in order to be uniquely recognizable within a plurality of computing devices and all branches of the financial institution when performing electronic transactions and in order to allow transactions with the transaction system 132.

Accordingly, the configuration information comprises a unique identification number for uniquely identifying the computer device for the transactions and configuration settings for configuring the computer device according to pre-defined requirements for the particular branch in dependence upon the device type. Such unique identification is used when maintaining a book of records within the central server which tracks transactions for all of the associated branches, corresponding branch servers and associated computing devices.

Operations 312 further comprise configuring the computer device 102 (e.g. operating system registry, and device applications relating to processing transactions) using the configuration information to uniquely perform the transactions for the financial institution using the unique identification number and permit processing of the transactions according to the configuration settings.

Accordingly, in at least one embodiment, the disclosed systems and methods allow automatic configuration of a computing device 102, based on detecting a change in the network. The automatic configuration including unique identification assignment of the computing device as being associated with its local branch server 112 and configuration of transactions for the computing device based on the computing device's type as characterized by its peripheral devices 106.

By way of example, a user for laptop device A (e.g. computing device 102) re-locates the laptop device A to "Branch1234" (e.g. server 112) according to the computing environment 100. Accordingly, as a result of the enrollment and configuration processes of FIGS. 1-3, the laptop device A automatically detects that it is now located in "Branch1234", and laptop device A is automatically setup (via using a central server and repository) as having a unique identifier (e.g. as assigned via the central server) and assigned as operating within "Branch1234" so that all operations and financial transactions performed by laptop device A are captured within the Book of Records for the financial institution (e.g. as stored by the transaction system 132) accordingly and using the unique identifier. By way of further example, the laptop device A may first receive its unique identifier from the central server (e.g. 118) in response to a request for setup and subsequently submit to the central server 118 and/or the central repository 122 automatically detected information associated with the peripherals connected to the laptop device A. In response, the central server 118 and/or the central repository 122 is configured to provide to the laptop device A configuration settings relating to transactions, including for example, transactions that the laptop device A has access to.

It will be appreciated that in one aspect the teachings herein provide a method implemented by at least one processing device coupled to a memory and coupled to an I/O device.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium. By way of example, and not limitation, such computer-readable storage media can comprise RAM, ROM, EEPROM, optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a wired or wireless technology, such are included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more general purpose microprocessors, application specific integrated circuits (ASICs), field programmable logic arrays (FPGAs), digital signal processors (DSPs), or other similar integrated or discrete logic circuitry. The term "processor," as used herein may refer to any of the foregoing examples or any other suitable structure to implement the described techniques. In addition, in some aspects, the functionality described may be provided within dedicated software modules and/or hardware. Also, the techniques could be fully implemented in one or more circuits or logic elements. The techniques of this disclosure may be implemented in a wide variety of devices or apparatuses, an integrated circuit (IC) or a set of ICs (e.g., a chip set).

Other embodiments will be apparent to those skilled in the art from consideration of the specification and practice of the embodiments disclosed herein. The scope of the claims should not be limited by the embodiments set forth in the examples, but should be given the broadest interpretation consistent with the description as a whole.

What is claimed is:

1. A computer implemented method for automatically configuring a computer device within a physical location of an entity, the method comprising:
receiving an indication, via a broadcast signal from a server of the physical location, that the computer device is not configured for the physical location;
upon said indication, performing configuration steps of:
determining a device type for the computer device based on one or more connected peripheral devices;
sending metadata information identifying the device type to a central server;
in response to said sending, receiving configuration information from the central server for the computer device, the configuration information comprising a unique identification information and configuration settings for configuring the computer device according to pre-defined requirements for the physical location of the entity in dependence upon the device type; and
configuring the computer device using the configuration information and the unique identification information and permit processing of events transactions based on the configuration settings in the configuration information.

2. The method of claim 1, wherein the indication further comprises a listener service listening for an incoming signal indicating a presence from the server of the physical location to a plurality of computer devices.

3. The method of claim 1, wherein a prompt is presented to a user interface of the computer device to confirm that a location of the computer device has changed to the physical location and requesting confirmation of the metadata for the computer device and the device type.

4. The method of claim 1, wherein the configuration information of the computer device further comprises software application updates for one or more applications in compliance with updates to pre-defined requirements of the physical location.

5. The method of claim 1, wherein the configuration information further defines security access rights for the computer device based on the device type, the access rights maintained dynamically on a database of the central server.

6. The method of claim 5, further comprising: triggering the central server to update the access rights in response to said indication to incorporate the computer device having the device type.

7. The method of claim 1, wherein determining the device type comprises accessing a mapping table comprising various potential combinations of peripheral devices, associated with a particular device type.

8. The method of claim 7 wherein, upon determining the device type, updating and distributing to each computer device in a network of the physical location a peripheral database comprising each device type and respective connected peripheral devices for each computer device associated with the server.

9. The method of claim 1, further comprising:
obtaining an initial indication of a change in the one or more connected peripheral devices;
based on the change, determining an updated device type for the computer device; and,
requesting and receiving updated configuration information from the central server based on the updated device type.

10. The method of claim 1, wherein the connected peripheral devices further comprise: a pin pad, a cash recycling unit, a cash dispensing unit, a thermal printer, an impact printer, a cheque scanner, a mouse, and a keyboard.

11. The method of claim 1, wherein the central server further comprises an application programming interface (API) for interfacing with the computer device to receive requests from the computer device for the configuration information.

12. The method of claim 1, wherein the unique identification information is a string of characters containing identification for the entity, the physical location, the computer device and the device type.

13. The method of claim 7, further comprising: receiving an update to the mapping table at an interface of the computer device, and in response to the update, requesting and receiving updated configuration information.

14. A non-transitory computer readable medium storing computer executable instructions for automatically configuring a computer device located at a physical location of an entity, the computer executable instructions being executable by a processor and when executed by the processor causes:
receiving an indication, via a broadcast signal from a server of the physical location, that the computer device is not configured for the physical location;
upon said indication, performing configuration steps of:
determining a device type for the computer device based on one or more connected peripheral devices;
sending metadata information identifying the computer device to a central server;
in response to said sending, receiving configuration information from the central server for the computer device, the configuration information comprising a unique identification information and configuration settings for configuring the computer device according to pre-defined requirements for the physical location of the entity in dependence upon the device type; and
configuring the computer device using the configuration information and the unique identification information and cause managing and controlling permit processing of transactions based on the configuration settings in the configuration information.

15. A computer device for performing automatic configuration, the computer device located at a particular location of an entity, the device comprising:
a storage device storing instructions;
a communications interface;
at least one processor in communication with the storage device and the communications interface, the at least one processor configured to execute the instructions to:
detect, based on received broadcast signal from at least one other computer device at the particular location, metadata characterizing the particular location;
determine, based on the metadata, whether the computer device requires configuration for the particular location and upon a determination of requiring configuration, performing configuration steps of:
automatically determine a device type for the computer device based on one or more connected peripheral devices;
send metadata identifying the computer device to a central server;
in response to said send, receive configuration information from the central server for the computer device, the configuration information comprising a unique identification information and configuration settings for configuring the computer device according to pre-defined requirements for the physical location of the entity in dependence upon the device type; and
configure the computer device using the configuration information and the unique identification information and permit processing of transactions based on the configuration settings in the configuration information.

16. The computer device of claim 15, wherein the configuration information further comprises software application updates for one or more applications in compliance with updates to pre-defined requirements of the particular location.

17. The computer device of claim 15, wherein the configuration information further defines security access rights for the computer device.

18. The computer device of claim 15, wherein determining the device type comprises, the at least one processor further being configured for: accessing a mapping table comprising various potential combinations of peripheral devices for the entity, each of said combinations associated with a particular device type.

19. The computer device of claim 15, wherein the at least one processor is further configured for:
obtaining an initial indication of a change in the one or more connected peripheral devices;
based on the change, determining an updated device type for the computer device; and
requesting and receiving updated configuration information from the central server.

* * * * *

UNITED STATES PATENT AND TRADEMARK OFFICE
CERTIFICATE OF CORRECTION

| | | |
|---|---|---|
| PATENT NO. | : 12,353,892 B2 | Page 1 of 1 |
| APPLICATION NO. | : 18/101356 | |
| DATED | : July 8, 2025 | |
| INVENTOR(S) | : Michael Reid Pearce et al. | |

It is certified that error appears in the above-identified patent and that said Letters Patent is hereby corrected as shown below:

In the Claims

Column 16, Claim 1, Line 23:
"processing of events transactions" should read -- processing of transactions --.

Column 17, Claim 14, Line 40:
"and cause managing and controlling permit" should read -- and permit --.

Signed and Sealed this
Twenty-third Day of December, 2025

John A. Squires
*Director of the United States Patent and Trademark Office*